Patented Nov. 27, 1928.

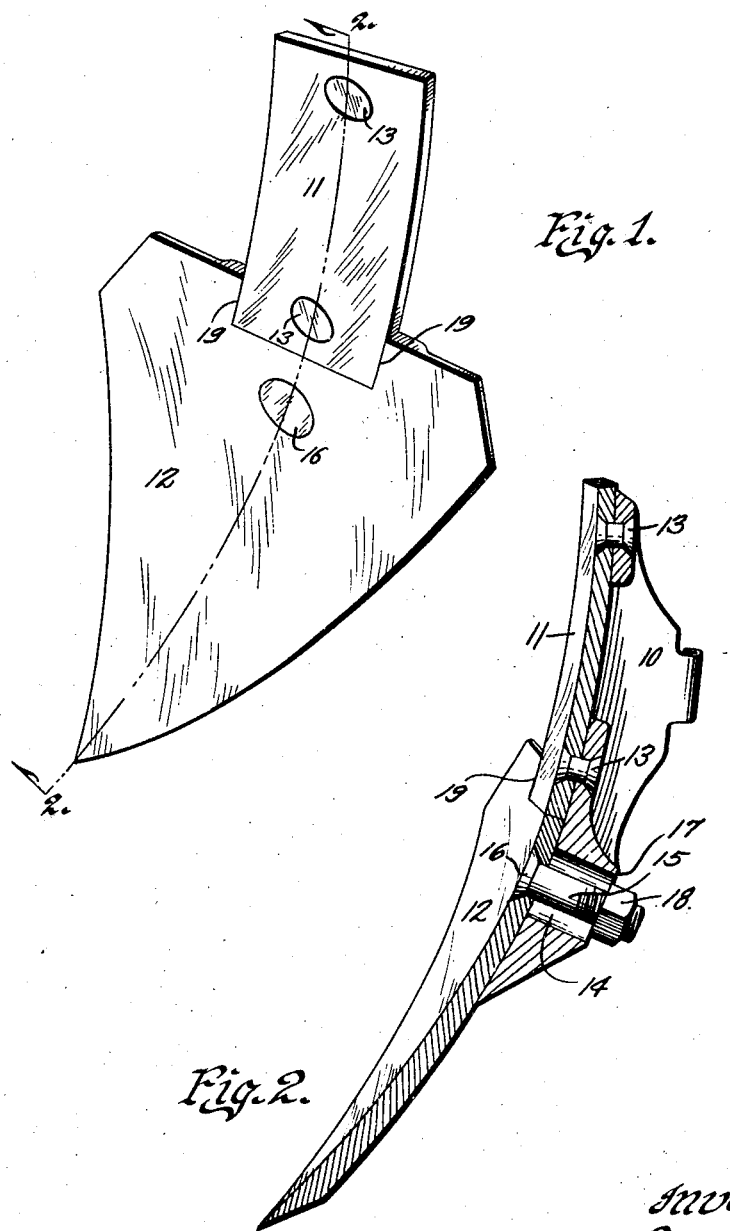

1,693,047

UNITED STATES PATENT OFFICE.

CHRISTIAN OSMUNDSON, OF WEBSTER CITY, IOWA.

CULTIVATOR-SHOVEL STRUCTURE.

Application filed June 22, 1925. Serial No. 38,729.

The object of my invention is to provide a cultivator shovel structure of simple, durable and inexpensive construction.

My invention relates to that type of cultivator shovel structures in which there is a support for mounting the shovel on a cultivator, and a shank and shovel proper both secured to the support.

It is my purpose to provide such a shank and shovel having coacting parts and means for connecting them together and to the support for affording a rigid mounting for the shovel by means of a single bolt.

With these and other objects in view, my invention consists in the construction, arrangement and combination of the various parts of my cultivator shovel structure, whereby the objects contemplated are attained, as hereinafter more fully set forth, pointed out in my claim, and illustrated in the accompanying drawings, in which:

Figure 1 shows a perspective view of a cultivator shovel embodying my invention; and Figure 2 shows a vertical, central, sectional view through the same taken on the line 2—2 of Figure 1.

In the accompanying drawings, I have used the reference numeral 10 to indicate generally a support adapted to be mounted on a cultivator and to have mounted on it the shank 11 and shovel 12.

The support 10 has its front face concave from its upper to its bottom part with the lower portion thereof inclined downwardly and forwardly as illustrated.

The upper portion of the support 10 has fitted to it the shank 11 just referred to. The shank 11 is fastened to the support by means of rivets or the like 13. The lower part of the support has a slot 14 therein.

The rear surface of the shovel 12 is fitted to the lower surface of the support 10.

A straight bolt 15 is extended through the shovel 12 at right angles thereto and has its head 16 countersunk in the forward surface of the shovel 12.

The rear lower surface of the support 10 around the slot 14 is so arranged as to lie in a surface substantially at right angles to the bolt 15 when the latter is installed at right angles to the shovel 12.

While the surfaces of the shovel 12 are curved and the rear surface 17 of the support 10 just referred to is flat, they are arranged as nearly parallel as possible.

The bolt 15 has on its a nut 18, which bears against the surface 17 for locking the shovel 12 to the support 10. The shovel 12 is provided at its upper end with a notch 19 to snugly receive and fit the lower end of the shank 11.

In certain cultivating jobs, a lower shovel may be found desirable in which case, the shovel 12 may be lowered by loosening and sliding the bolt 15 downward in the slot 14. The notch 19 engages the sides of the shank 11 so that even though the shovel 12 is adjusted to a lower position than that illustrated, the notch still serves to prevent rotation of the shovel on the bolt 15.

This is a feature of considerable importance in my cultivator shovel.

There has been some problem involved in locking the shovel to the support in a structure of this type in such manner that the shovel will not rock sidewise.

In the present device, it is to be noted that the shank is fastened to the support at substantially different points in its height, and that the shovel is fastened to the support by means of the bolt 15 and is also connected with the shank 11 at the lower end thereof by receiving such lower end in the notch 19.

This latter connection is such as to hold the shovel snugly and rigidly against any rotation on the bolt 15.

By providing the notch 19, it is seen that the shovel 12 projects a little higher than the ordinary shovel, which is a matter of advantage in the cultivating of certain soils.

Some changes may be made in the details of the construction and arrangement of my improved cultivator shovel without departing from the real spirit and purpose of my invention, and it is my intention to cover by my claim, any such modification of structure or use of mechanical equivalents, which may be reasonably included within its scope.

I claim as my invention:

A cultivator shovel comprising a support adapted to be mounted on a cultivator, a parallel sided shank rigidly connected with the upper portion of said support, said support having a slot in its lower portion, a shovel engaging said lower portion and having in its upper end a notch having parallel sides to receive the lower end of the shank and engage the sides thereof, a bolt extended through the shovel and through said slot and a nut on said bolt, the sides of said slot in the shovel coacting with said shank and in conjunction with said bolt serving to hold the shovel rigidly in position with respect to said support even when the bottom of the notch is spaced from the bottom of the shank.

Des Moines, Iowa, April 25, 1925.

CHRISTIAN OSMUNDSON.